(12) United States Patent
Kim

(10) Patent No.: US 12,021,283 B2
(45) Date of Patent: Jun. 25, 2024

(54) ELECTRODE FOR FUEL CELL HAVING HIGH DURABILITY, METHOD FOR MANUFACTURING SAME, AND MEMBRANE-ELECTRODE ASSEMBLY COMPRISING SAME

(71) Applicant: KOLON INDUSTRIES, INC., Seoul (KR)

(72) Inventor: Jung Ho Kim, Seoul (KR)

(73) Assignee: Kolon Industries, Inc., Seoul (KR)

(*) Notice: Subject to any disclaimer, the term of this patent is extended or adjusted under 35 U.S.C. 154(b) by 49 days.

(21) Appl. No.: 17/625,808

(22) PCT Filed: Dec. 23, 2020

(86) PCT No.: PCT/KR2020/018963
§ 371 (c)(1),
(2) Date: Jan. 10, 2022

(87) PCT Pub. No.: WO2021/137513
PCT Pub. Date: Jul. 8, 2021

(65) Prior Publication Data
US 2022/0263108 A1 Aug. 18, 2022

(30) Foreign Application Priority Data
Dec. 30, 2019 (KR) .................. 10-2019-0178200

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8668* (2013.01); *H01M 4/8828* (2013.01);
(Continued)

(58) Field of Classification Search
CPC .................................................. H01M 8/1004
See application file for complete search history.

(56) References Cited

U.S. PATENT DOCUMENTS

2001/0049033 A1* 12/2001 Oko .................... H01M 8/0662
429/410
2012/0107688 A1* 5/2012 Loveridge ......... H01M 10/0525
29/623.5
(Continued)

FOREIGN PATENT DOCUMENTS

| CN | 100468853 C | 3/2009 |
| CN | 101512801 A | 8/2009 |

(Continued)

OTHER PUBLICATIONS

JP2017002393translation (Year: 2023).*

(Continued)

*Primary Examiner* — Brian R Ohara
(74) *Attorney, Agent, or Firm* — Harvest IP Law, LLP

(57) ABSTRACT

Disclosed are an electrode for a fuel cell, a method for manufacturing same, and a membrane-electrode assembly comprising same, the electrode having high durability by preventing catalyst degradation due to the agglomeration, deposition, elution, and/or migration of metal catalyst particles. The electrode for a fuel cell of the present invention comprises: a catalyst comprising a carrier and metal catalyst particles supported on the carrier; and an ionomer layer coated on at least a portion of the catalyst, wherein the ionomer layer comprises an ionomer and a chelating agent.

6 Claims, 3 Drawing Sheets

(51) Int. Cl.
*H01M 4/88* (2006.01)
*H01M 4/92* (2006.01)
*H01M 8/10* (2016.01)
*H01M 8/1018* (2016.01)

(52) U.S. Cl.
CPC ......... *H01M 4/926* (2013.01); *H01M 8/1018* (2013.01); *H01M 2008/1095* (2013.01); *H01M 2300/0082* (2013.01); *H01M 2300/0094* (2013.01)

(56) References Cited

U.S. PATENT DOCUMENTS

| | | | | |
|---|---|---|---|---|
| 2015/0147651 A1* | 5/2015 | Hong | ................ | H01M 4/0471 427/126.3 |
| 2021/0159509 A1* | 5/2021 | Yang | ................ | H01M 8/1044 |
| 2022/0257801 A1* | 8/2022 | Laurent | ............ | A61K 49/0002 |

FOREIGN PATENT DOCUMENTS

| | | |
|---|---|---|
| CN | 101714635 A | 5/2010 |
| CN | 102612781 A | 7/2012 |
| JP | 2010506822 A | 3/2010 |
| JP | 2010244700 A | 10/2010 |
| JP | 2011044243 A | 3/2011 |
| JP | 2014050791 A | 3/2014 |
| JP | 2016504176 A | 2/2016 |
| JP | 2017002393 A | 1/2017 |
| JP | 2017006809 A | 1/2017 |
| JP | 2019522884 A | 8/2019 |
| KR | 20080102938 A | 11/2008 |
| KR | 20100038543 A | 4/2010 |
| KR | 101922636 B1 | 11/2018 |
| TW | 201929304 A | 7/2019 |
| WO | 2008032802 A1 | 3/2008 |

OTHER PUBLICATIONS

"Au-dimercaprol functionalized cellulose aerogel: Synthesis, characterization and catalytic application, Sajjad Keshipour et al. Applied Organometallic Chemistry".

The office action dated May 30, 2023 related to the corresponding Japanese Patent application.

The office action dated Aug. 31, 2023 related to the corresponding Chinese Patent application.

* cited by examiner (a)          (b)

(a)          (b)

ELECTRODE FOR FUEL CELL HAVING HIGH DURABILITY, METHOD FOR MANUFACTURING SAME, AND MEMBRANE-ELECTRODE ASSEMBLY COMPRISING SAME

CROSS REFERENCE TO RELATED APPLICATIONS

This application is a National Stage of International Application No. PCT/KR2020/018963 filed Dec. 23, 2020, claiming priority based on Korean Patent Application No. 10-2019-0178200 filed Dec. 30, 2019.

TECHNICAL FIELD

The present disclosure relates to an electrode for fuel cells, a method of producing the same, and a membrane-electrode assembly including the same. More particularly, the present disclosure relates to an electrode for fuel cells having high durability by preventing catalyst deterioration due to agglomeration, precipitation, dissolution, and/or migration of metal catalyst particles, a method of producing the same, and a membrane-electrode assembly including the same.

BACKGROUND ART

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source capable of replacing fossil fuels due to the high energy efficiency and environmental friendliness thereof.

The membrane-electrode assembly generally includes an anode (also referred to as a "fuel electrode"), a cathode (also referred to as an "air electrode"), and a polymer electrolyte membrane (PEM) interposed therebetween.

When fuel such as hydrogen gas is supplied to an anode, the hydrogen at the anode is oxidized to produce a proton ($H^+$) and an electron ($e^-$). The produced proton is transferred to the cathode through the polymer electrolyte membrane (PEM), whereas the generated electron is transferred to the cathode through an external circuit. Oxygen in the air supplied to the cathode is bonded to the proton and the electron, and thus is reduced to thereby produce water.

Platinum or platinum alloys, having high catalytic activity and high corrosion resistance, are used as a metal catalyst for forming an electrode for a fuel cell.

In addition, in an effort to increase the active surface area of the catalyst, a catalyst formed by dispersing metal catalyst particles on the surface of an electrically conductive support (e.g., carbon, metal oxide or $C_3N_4$) has been generally used.

FIG. 1 is a schematic diagram showing a conventional electrode for fuel cells before and after a voltage cycling test (VC test).

A conventional electrode for fuel cells includes a catalyst 10 and an ionomer layer 20 disposed on the catalyst 10. The catalyst 10 includes a support 11 and a plurality of metal catalyst particles 12 supported on the support 111.

As illustrated in FIG. 1, when the fuel cell is operated for a long period of time, agglomeration (11a), precipitation, dissolution, and/or migration (11b) of the metal catalyst is caused by high-voltage and highly acidic environments, which accelerates the degradation of the catalyst 10. Therefore, it is very important to prevent deterioration of the catalyst upon long-term operation of the fuel cell to increase the durability and lifespan of the fuel cell.

In an attempt to prevent deterioration of the catalyst, coating the surface of the metal catalyst particles with a carbon shell has been suggested. However, the carbon shell is disadvantageous because it reduces the active area of the catalyst and interferes with the transfer of substances such as gas and/or water and thus decreases the output performance of the fuel cell. In addition, the carbon shell is not economical because it requires a separate process for introducing the carbon shell.

DISCLOSURE

Technical Problem

Therefore, the present disclosure relates to an electrode for fuel cells that is capable of preventing problems caused by limitations and disadvantages of the related technology as described above, a method of producing the same, and a membrane-electrode assembly including the same.

It is one object of the present disclosure to provide an electrode for fuel cells having high durability by preventing catalyst deterioration due to agglomeration, precipitation, dissolution, and/or migration of metal catalyst particles.

It is another object of the present disclosure to provide a method of producing an electrode for fuel cells having high durability by preventing catalyst deterioration due to agglomeration, precipitation, dissolution, and/or migration of metal catalyst particles.

It is another object of the present disclosure to provide a membrane-electrode assembly having high durability.

In addition to the aspects of the present disclosure described above, other features and advantages of the present disclosure will be described in the following detailed description, or will be more clearly understood by those skilled in the art to which the present disclosure pertains.

Technical Solution

In accordance with one aspect of the present disclosure, provided is an electrode for a fuel cell including: a catalyst including a support and a plurality of metal catalyst particles supported on the support; and an ionomer layer coated on at least a part of the catalyst, wherein the ionomer layer includes an ionomer and a chelating agent.

The ionomer layer may be bonded to the catalyst using only a physical bond, not a chemical bond.

The ionomer may be a fluorine-based ionomer or a hydrocarbon-based ionomer.

The chelating agent may be dimercaprol, phthalocyanine, M-phthalocyanine (wherein M is Cu, Co, Fe, or Mo), penicillamine, succimer, deferoxamine, EDTA, EGTA, Prussian blue, vitamin B-12, α-lipoic acid, ethylenediamine, triethylamine, phenanthroline, desferrioxamine, deferiprone, or a mixture of two or more thereof.

The chelating agent may be dimercaprol, penicillamine, succimer, α-lipoic acid, triethylamine, deferiprone, or a mixture of two or more thereof.

The chelating agent may include at least one S atom.

The chelating agent including at least one S atom may be dimercaprol, penicillamine, succimer, α-lipoic acid, or a mixture of two or more thereof.

The chelating agent may include at least two S atoms.

The chelating agent including at least two S atoms may be dimercaprol, succimer, α-lipoic acid, or a mixture of two or more thereof.

In another aspect of the present disclosure, provided is a method of producing an electrode for a fuel cell including: preparing an electrode slurry containing a catalyst, an ionomer, a chelating agent, and a dispersion medium; coating a film or a membrane with the electrode slurry to form a slurry layer; and removing the dispersion medium from the slurry layer.

The electrode slurry may contain 0.01 to 10 parts by weight of the chelating agent based on 100 parts by weight of the ionomer.

The preparing the electrode slurry may include: preparing a mixture containing the ionomer and the chelating agent; preparing a catalyst dispersion containing the catalyst and the dispersion medium; mixing the mixture with the catalyst dispersion to obtain a mixed solution; and dispersing the mixed solution using a homogenizer, a high-pressure disperser, a ball mill, a powder mixer, or a resonant acoustic mixer.

The preparing the catalyst dispersion may include: wetting the catalyst with water; and dispersing the catalyst wetted with water in the dispersion medium.

The preparing the electrode slurry may include: preparing a mixture containing the ionomer and the chelating agent; preparing a catalyst dispersion containing the catalyst; mixing the mixture with the catalyst dispersion to obtain a mixed solution; dispersing the mixed solution using a homogenizer, a high-pressure disperser, a ball mill, a powder mixer, or a resonance acoustic mixer; drying the dispersed mixed solution to obtain a solid; heat-treating the solid; and dispersing the heat-treated solid in the dispersion medium using a homogenizer, a high-pressure disperser, a ball mill, a powder mixer, or a resonance acoustic mixer.

The catalyst dispersion may be prepared by dispersing the catalyst in water.

The preparing the electrode slurry may include: mixing an ionomer dispersion containing the ionomer with a catalyst dispersion containing the catalyst to obtain a first mixed solution; dispersing the first mixed solution using a homogenizer, a high-pressure disperser, a ball mill, a powder mixer, or a resonance acoustic mixer; drying the dispersed first mixed solution to obtain a solid; heat-treating the solid; mixing the heat-treated solid with the dispersion medium to obtain a second mixed solution; preparing a mixture containing the ionomer and the chelating agent; mixing the mixture with the second mixed solution to obtain a third mixed solution; and dispersing the third mixed solution using a homogenizer, a high-pressure disperser, a ball mill, a powder mixer, or a resonance acoustic mixer.

The catalyst dispersion may contain water as a dispersion medium.

The preparing the electrode slurry may include: preparing a mixture containing the ionomer and the chelating agent; preparing a catalyst dispersion containing the catalyst; mixing a part of the mixture with the catalyst dispersion to obtain a first mixed solution; dispersing the first mixed solution using a homogenizer, a high-pressure disperser, a ball mill, a powder mixer, or a resonance acoustic mixer; drying the dispersed first mixed solution to obtain a solid; heat-treating the solid; mixing the heat-treated solid and the remainder of the mixture with the dispersion medium to obtain a second mixed solution; and dispersing the second mixed solution using a homogenizer, a high-pressure disperser, a ball mill, a powder mixer, or a resonance acoustic mixer.

The catalyst dispersion may be prepared by dispersing the catalyst in water.

In another aspect of the present disclosure, provided is a membrane-electrode assembly including an anode, a cathode, and a polymer electrolyte membrane interposed between the anode and the cathode, wherein at least one of the anode and cathode is the electrode described above.

The general description of the present disclosure as provided above is only for illustration or description of the present disclosure, and does not limit the scope of the present disclosure.

Advantageous Effects

According to the present disclosure, an electrode for a fuel cell is formed using an electrode slurry containing a chelating agent, so that the ionomer layer containing the chelating agent in addition to the ionomer covers at least a part of the catalyst. The ionomer layer of the present disclosure captures the metal ions obtained from the metal catalyst particles and allows the metal ions to return to the original place thereof when the environment changes, thereby inhibiting the agglomeration and precipitation of the metal catalyst particles and preventing the dissolution and migration of the metal catalyst.

Therefore, according to the present disclosure, the durability of an electrode for a fuel cell and a membrane-electrode assembly including the same can be improved, and thus the lifespan of the fuel cell can be prolonged by preventing catalyst deterioration due to agglomeration, deposition, elution, and/or movement of metal catalyst particles.

DESCRIPTION OF DRAWINGS

The accompanying drawings, which are provided for better understanding of the present disclosure and constitute a part of the present specification, are given to exemplify the embodiments of the present disclosure and describe the principles and features of the present disclosure with reference to the following detailed description, in which.

Figure 5:
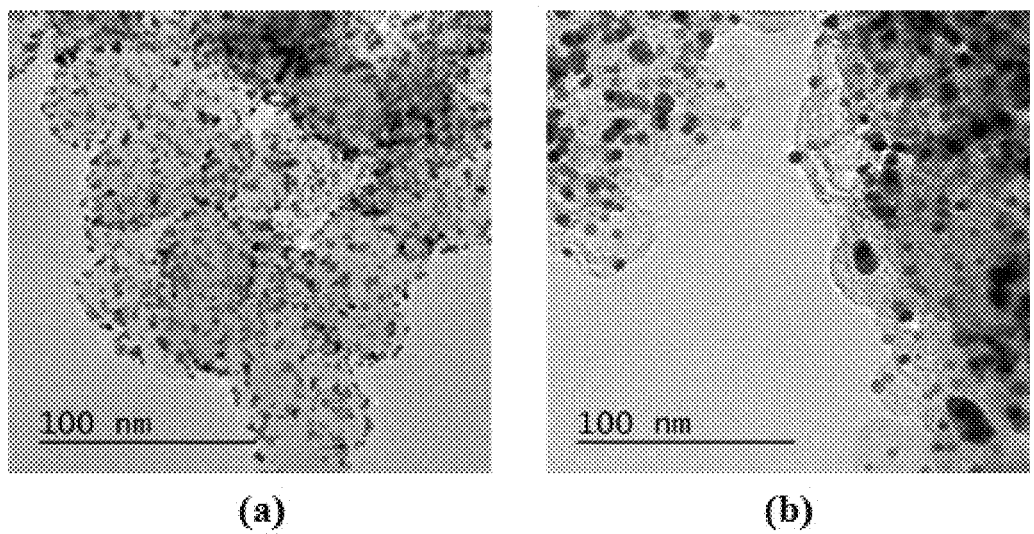
Figure 6:
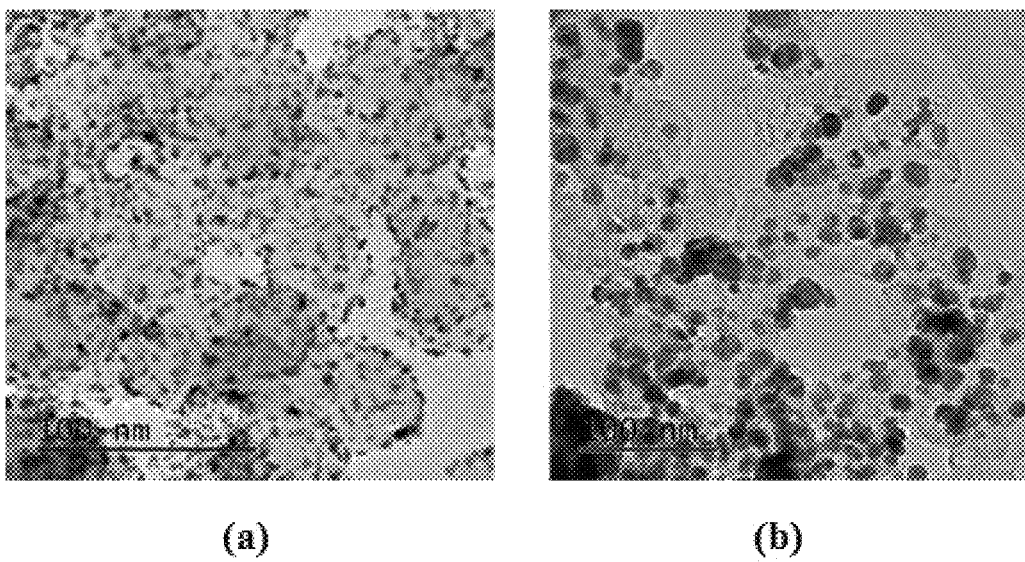

(a) and (b) of FIG. 5 are TEM images showing the electrode produced using the electrode slurry of Example 1 before and after a voltage cycling test; and (a) and (b) of FIG. 6 are TEM images showing the electrode produced using the electrode slurry of Comparative Example 1 before and after a voltage cycling test.

BEST MODE

Hereinafter, the present disclosure will be described in more detail with reference to specific examples. However, the following examples are provided only for better understanding of the present disclosure, and should not be construed as limiting the scope of the present disclosure.

Figure 1:
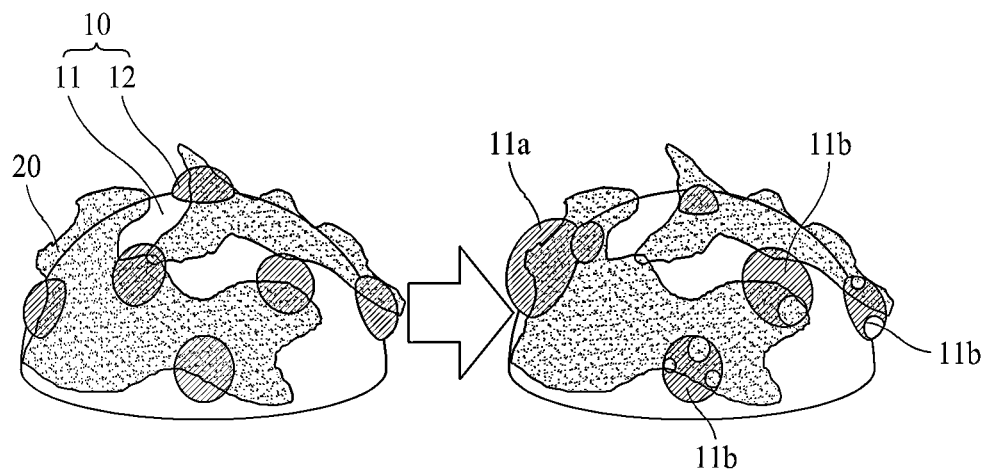
FIG. 1 is a schematic diagram showing a conventional electrode for fuel cells before and after a voltage cycling test (VC test)
Figure 2:
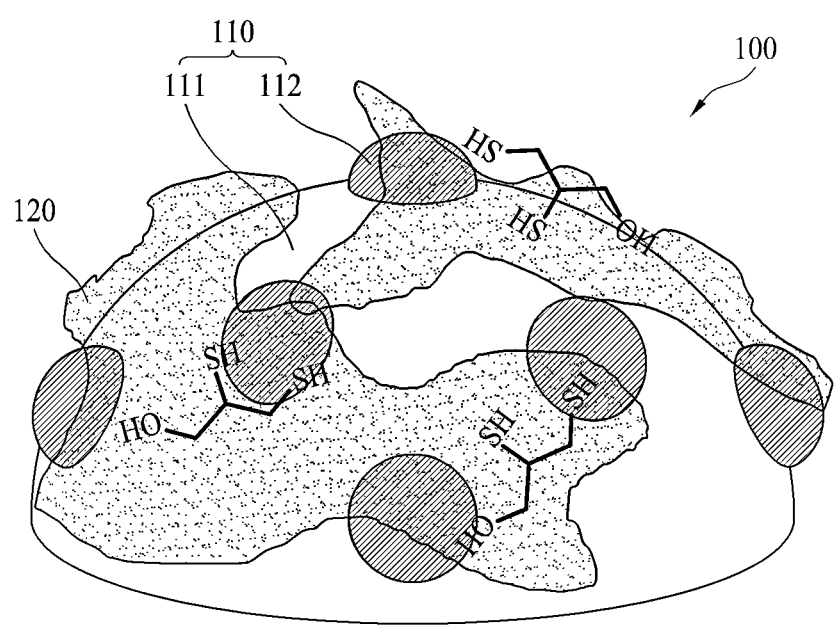
FIG. 2 is a schematic diagram showing an electrode for fuel cells according to an embodiment of the present disclosure.

FIG. 2 is a schematic diagram showing an electrode 100 for a fuel cell according to an embodiment of the present disclosure.

As illustrated in FIG. 2, the electrode 100 for a fuel cell of the present disclosure includes a catalyst 110 and an ionomer layer 120 coated on at least a part of the catalyst 110.

The catalyst 110 includes a support 111 and a plurality of metal catalyst particles 112 supported on the support 111.

The support 111 may be (i) a carbon-based support, (ii) a porous inorganic oxide support such as zirconia, alumina, titania, silica, and ceria, or (iii) a zeolite support.

The carbon-based support may be graphite, super P, carbon fiber, carbon sheet, carbon black, Ketjen black, Denka black, acetylene black, carbon nanotubes (CNT), carbon spheres, carbon ribbon, fullerene, active carbon, carbon nanowires, carbon nanoballs, carbon nanohorns, carbon nanocages, carbon nanorings, ordered nano-/mesoporous carbon, carbon aerogel, mesoporous carbon, graphene, stabilized carbon, or a combination of two or more thereof.

The metal catalyst particles 112 may be platinum (Pt) particles or platinum-based alloy particles.

The platinum-based alloy may be Pt—Pd, Pt—Mn, Pt—Sn, Pt—Mo, Pt—W, Pt—Ru, Pt—Ru—W, Pt—Ru—Ni, Pt—Ru—Mo, Pt—Ru—Rh—Ni, Pt—Ru—Sn—W, Pt—Ru—Ir—Ni, Pt—Co, Pt—Co—Mn, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, or Pt—Cr—Ir.

The ionomer layer 120 of the present disclosure includes an ionomer and a chelating agent.

According to an embodiment of the present disclosure, the ionomer layer 120 is bonded to the catalyst 110 only through a physical bond rather than a chemical bond, thereby preventing deterioration of the catalytic activity of the catalyst 110.

The ionomer of the ionomer layer 120 serves to transfer cations, and also serves as a binder for improving adhesion between the catalyst 110 and the polymer electrolyte membrane (PEM).

The ionomer may have at least one ion-conducting group selected from the group consisting of a sulfonic acid group, a carboxyl group, a boronic acid group, a phosphoric acid group, an imide group, a sulfonimide group, a sulfonamide group, and a sulfonic fluoride group.

For example, the ionomer may be a fluorine-based ionomer such as poly(perfluorosulfonic acid) or poly(perfluorocarboxylic acid).

Alternatively, the ionomer may be a hydrocarbon-based polymer such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The chelating agent of the ionomer layer 120 captures the metal ions derived from the metal catalyst particles 112 during long-term operation of the fuel cell, and allows the metal ions to return to the original place thereof when the environment changes, thereby inhibiting the agglomeration and precipitation of the metal catalyst particles 112 and preventing the dissolution and migration of the metal catalyst.

Figure 3:
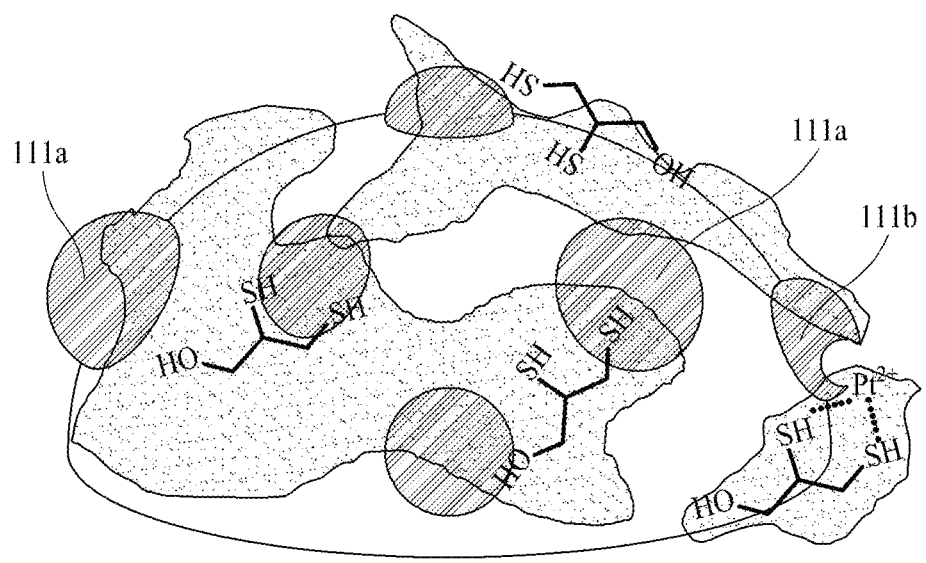
FIG. 3 is a schematic diagram showing an electrode for fuel cells according to an embodiment of the present disclosure after a voltage cycling test.

FIG. 3 is a schematic diagram showing an electrode for a fuel cell according to an embodiment of the present disclosure after a voltage cycling test and shows that metal ions (Pt') derived from the metal catalyst particles 111b form a coordination bond with a chelating agent (dimercaprol), thereby minimizing the agglomeration 111a of the metal catalyst particles and returning the metal ions (Pt') to the original metal catalyst particles 111b upon environmental changes, thus preventing deterioration of the catalyst 110 due to dissolution and/or movement of the metal catalyst.

The chelating agent of the present disclosure is dimercaprol, phthalocyanine, M-phthalocyanine (where M is Cu, Co, Fe, or Mo), penicillamine, Succimer, deferoxamine, EDTA, EGTA, Prussian blue, vitamin B-12, α-lipoic acid, ethylenediamine, triethylamine, phenanthroline, desferrioxamine, deferiprone, or a mixture of two or more thereof, more preferably dimercaprol, penicillamine, succimer, α-lipoic acid, triethylamine, deferiprone, or a mixture of two or more thereof.

Preferably, the chelating agent of the present disclosure includes at least one S atom, and may be, for example, dimercaprol, penicillamine, succimer, α-lipoic acid, or a mixture of two or more thereof.

More preferably, the chelating agent of the present disclosure contains at least two S atoms, and may be, for example, dimercaprol, succimer, α-lipoic acid, or a mixture of two or more thereof.

Compared to other atoms (e.g., N atom), the S atom binds well with metal ions derived from the metal catalyst particles 111b and has stronger binding force therewith, thereby effectively capturing the metal ions and increasing the durability of the electrode 100. In particular, dimercaprol forms a chelate bond well enough to be biochemically used as an antidote for heavy metals.

Hereinafter, a method of producing the electrode 100 for a fuel cell of the present disclosure will be described in detail.

The method of the present disclosure includes: (i) preparing an electrode slurry containing a catalyst, an ionomer, a chelating agent and a dispersion medium; (ii) coating a film or a membrane with the electrode slurry to form a slurry layer; and (iii) removing the dispersion medium from the slurry layer.

Each of the catalyst, the ionomer, and the chelating agent has been described in detail above, and thus a description thereof will be omitted below.

The dispersion medium may be water, a hydrophilic solvent, an organic solvent, or a mixture of two or more thereof.

The hydrophilic solvent may be a compound containing, as a main chain, a linear or branched saturated or unsaturated hydrocarbon having 1 to 12 carbon atoms, and having at least one functional group selected from the group consisting of alcohols, isopropyl alcohol, ketones, aldehydes, carbonates, carboxylates, carboxylic acids, ethers, and amides.

The organic solvent may be N-methylpyrrolidone (NMP), dimethylsulfoxide (DMSO), tetrahydrofuran (THF), dimethylacetamide (DMAc), or a mixture of two or more thereof, but is not limited thereto.

According to an embodiment of the present disclosure, the dispersion medium of the electrode slurry may be ethanol, distilled water, isopropyl alcohol, normal propyl alcohol, butanol, or a mixture of two or more thereof, but is not limited thereto.

The electrode slurry may contain 0.01 to 10 parts by weight of the chelating agent based on 100 parts by weight of the ionomer. When the content of the chelating agent is less than 0.01 parts by weight, a satisfactory effect of preventing catalyst deterioration cannot be obtained. On the other hand, when the content of the chelating agent exceeds 10 parts by weight, the activity of the metal catalyst may be inhibited, resulting in deterioration of the performance of the fuel cell.

An electrode is formed on at least one surface of the polymer electrolyte membrane (PEM) through decal transfer or direct coating using the electrode slurry.

That is, in the case of the decal transfer method, a release film is coated with the electrode slurry to form a slurry layer, the dispersion medium is removed from the slurry layer through a drying process to form an electrode, hot-pressing is performed in the state in which the release film and the polymer electrolyte membrane (PEM) are stacked such that the release film contacts the polymer electrolyte membrane (PEM), and then the release film is removed.

In the case of the direct coating method, a mask film having an electrode window is stacked on one surface of the polymer electrolyte membrane (PEM), the electrode slurry is coated on one surface of the polymer electrolyte membrane (PEM) to form a slurry layer, the dispersion medium is removed from the slurry layer to form an electrode, and then the mask film is removed.

The electrode slurry of the present disclosure may be prepared through any of various methods.

A first method of preparing the electrode slurry may include (i) preparing a mixture containing the ionomer and the chelating agent, (ii) preparing a catalyst dispersion containing the catalyst and the dispersion medium, (iii) mixing the mixture with the catalyst dispersion to obtain a mixed solution, and (iv) dispersing the mixed solution using a homogenizer, a high-pressure disperser, a ball mill, a powder mixer, or a resonant acoustic mixer.

The mixture containing the ionomer and the chelating agent may be obtained by adding the chelating agent to the ionomer dispersion, followed by mixing to homogeneity. The ionomer dispersion may be a commercially available fluorine-based ionomer dispersion (e.g., Nafion dispersion).

The catalyst dispersion may be obtained by wetting the catalyst with water and dispersing the catalyst in the dispersion medium for the electrode slurry according to the present disclosure described above. The reason for wetting the catalyst with water is that the catalyst may ignite if brought into contact with alcohol or the like first, due to the high reactivity of the catalyst.

A second method of preparing the electrode slurry may include (i) preparing a mixture containing the ionomer and the chelating agent, (ii) preparing a catalyst dispersion containing the catalyst, (iii) mixing the mixture with the catalyst dispersion to obtain a mixed solution, (iv) dispersing the dispersed mixed solution using a homogenizer, a high-pressure disperser, a ball mill, a powder mixer, or a resonance acoustic mixer, (v) drying the dispersed mixed solution to obtain a solid, (vi) heat-treating the solid, and (vii) dispersing the heat-treated solid in the dispersion medium using a homogenizer, a high-pressure disperser, a ball mill, a powder mixer, or a resonance acoustic mixer.

The mixture containing the ionomer and the chelating agent may be obtained by adding the chelating agent to the ionomer dispersion, followed by mixing to homogeneity.

The ionomer dispersion may be a commercially available fluorine-based ionomer dispersion (e.g., Nafion dispersion).

The catalyst dispersion may be prepared by dispersing the catalyst in water. The reason for using water as the dispersion medium is that the catalyst may ignite if brought into contact with alcohol or the like first due to the high reactivity of the catalyst.

The drying may be performed at 60 to 90° C. for 5 to 10 hours, and the heat treatment may be performed at 90 to 150° C. for 1 to 3 hours.

A third method of preparing the electrode slurry may include (i) mixing an ionomer dispersion containing the ionomer with a catalyst dispersion containing the catalyst to obtain a first mixed solution, (ii) dispersing the first mixed solution using a homogenizer, a high-pressure disperser, a ball mill, a powder mixer, or a resonance acoustic mixer, (iii) drying the dispersed first mixed solution to obtain a solid, (iv) heat-treating the solid, (v) mixing the heat-treated solid with the dispersion medium to obtain a second mixed solution, (vi) preparing a mixture containing the ionomer and the chelating agent, (vii) mixing the mixture with the second mixed solution to obtain a third mixed solution, and (viii) dispersing the third mixed solution using a homogenizer, a high-pressure disperser, a ball mill, a powder mixer, or a resonance acoustic mixer.

The ionomer dispersion may be a commercially available fluorine-based ionomer dispersion (e.g., Nafion dispersion).

The catalyst dispersion may contain water as a dispersion medium.

The drying may be performed at 60 to 90° C. for 5 to 10 hours, and the heat treatment may be performed at 90 to 150° C. for 1 to 3 hours.

A fourth method of preparing the electrode slurry may include (i) preparing a mixture containing the ionomer and the chelating agent, (ii) preparing a catalyst dispersion containing the catalyst, (iii) mixing a part of the mixture with the catalyst dispersion to obtain a first mixed solution, (iv) dispersing the first mixed solution using a homogenizer, a high-pressure disperser, a ball mill, a powder mixer, or a resonance acoustic mixer, (v) drying the dispersed first mixed solution to obtain a solid, (vi) heat-treating the solid, (vii) mixing the heat-treated solid and the remainder of the mixture with the dispersion medium to obtain a second mixed solution, and (viii) dispersing the second mixed solution using a homogenizer, a high-pressure disperser, a ball mill, a powder mixer, or a resonance acoustic mixer.

The mixture containing the ionomer and the chelating agent may be obtained by adding the chelating agent to the ionomer dispersion, followed by mixing to homogeneity. The ionomer dispersion may be a commercially available fluorine-based ionomer dispersion (e.g., Nafion dispersion).

The catalyst dispersion may be prepared by dispersing the catalyst in water.

The drying may be performed at 60 to 90° C. for 5 to 10 hours, and the heat treatment may be performed at 90 to 150° C. for 1 to 3 hours.

The membrane-electrode assembly (MEA) of the present disclosure can be manufactured by forming an anode and a cathode on two surfaces of the polymer electrolyte membrane (PEM) according to the decal transfer method or the direct coating method described above using the electrode slurry prepared according to any one of the four methods described above.

Alternatively, the membrane-electrode assembly (MEA) of the present disclosure includes an anode, a cathode, and a polymer electrolyte membrane (PEM) interposed therebetween, wherein only one of the anode and the cathode is an electrode of the present disclosure, and the other is a conventional electrode.

Mode for Disclosure

Hereinafter, the present disclosure will be described in more detail with reference to specific examples. These examples are provided only for better understanding, and should not be construed as limiting the scope of the present disclosure.

Example 1

0.04 g of dimercaprol was added to 5 g of a poly(perfluorosulfonic acid) dispersion (solid content: 10 wt %), followed by mixing to homogeneity to obtain a mixture. 1 g of a Pt/C catalyst was wetted with water and then dispersed in 10 g of a dispersion medium (isopropyl alcohol) to obtain a catalyst dispersion. The mixture was mixed with the catalyst dispersion to obtain a mixed solution, and the mixed solution was dispersed using a high-pressure disperser to complete an electrode slurry.

Example 2

0.04 g of dimercaprol was added to 5 g of a poly(perfluorosulfonic acid) dispersion (solid content: 10 wt %), followed by mixing to homogeneity to obtain a mixture. 1 g of a Pt/C catalyst was dispersed in 100 g of water to obtain a catalyst dispersion. The mixture was mixed with the catalyst dispersion to obtain a mixed solution, and the mixed solution was dispersed using a high-pressure disperser. The dispersed mixed solution was dried at 80° C. for 8 hours to obtain a solid, and the solid was heat-treated at 120° C. for 2 hours. The heat-treated solid was dispersed in 10 g of a dispersion medium (isopropyl alcohol) using a high-pressure disperser to complete an electrode slurry.

Example 3

The catalyst dispersion obtained by dispersing 1 g of Pt/C catalyst in 100 g of water was mixed to homogeneity with 4 g of a poly(perfluorosulfonic acid) dispersion (solid content: 10 wt %) to obtain a first mixed solution. The first mixed solution was dispersed using a high-pressure disperser. The dispersed first mixed solution was dried at 80° C. for 8 hours to obtain a solid, and the solid was heat-treated at 120° C. for 2 hours. The heat-treated solid was mixed with 10 g of a dispersion medium (isopropyl alcohol) to obtain a second mixed solution. The second mixed solution was mixed with a mixture of 0.04 g of dimercaprol and 1 g of a poly(perfluorosulfonic acid) dispersion (solid content: 10 wt. %) to obtain a third mixed solution. Subsequently, the third mixed solution was dispersed using a high-pressure disperser to complete an electrode slurry.

Example 4

0.04 g of dimercaprol was added to 5 g of a poly(perfluorosulfonic acid) dispersion (solid content: 10 wt %), followed by mixing to homogeneity to obtain 5.04 g of a mixture. 1 g of a Pt/C catalyst was dispersed in 100 g of water to obtain a catalyst dispersion. 4 g of the mixture was mixed with the catalyst dispersion to obtain a first mixed solution. Then, the first mixed solution was dispersed using a high-pressure disperser. The dispersed first mixed solution was dried at 80° C. for 8 hours to obtain a solid, and the solid was heat-treated at 120° C. for 2 hours. The heat-treated solid, 1.04 g of the mixture, and 10 g of a dispersion medium (isopropyl alcohol) were mixed to obtain a second mixed solution. Subsequently, the second mixed solution was dispersed using a high-pressure disperser to complete an electrode slurry.

Comparative Example 1

1 g of a Pt/C catalyst was wetted in water and then dispersed in 10 g of a dispersion medium (isopropyl alcohol) to obtain a catalyst dispersion. Subsequently, the catalyst dispersion was mixed with 5 g of a poly(perfluorosulfonic acid) dispersion (solid content: 10 wt. %) and the resulting mixture was dispersed using a high-pressure disperser to complete an electrode slurry.

Comparative Example 2

A catalyst dispersion, obtained by dispersing 1 g of Pt/C catalyst in 100 g of water, was mixed with 5 g of a poly(perfluorosulfonic acid) dispersion (solid content: 10 wt. %) to obtain a mixed solution. Then, the mixed solution was dispersed using a high-pressure disperser. The dispersed mixed solution was dried at 80° C. for 8 hours to obtain a solid, and the solid was heat-treated at 120° C. for 2 hours. The heat-treated solid was mixed with 10 g of a dispersion medium (isopropyl alcohol) and then the resulting mixture was dispersed using a high-pressure disperser to complete an electrode slurry.

[CV Test and Voltage Cycling Test]

The electrode slurry was cast on a rotating disk electrode (RDE) and dried to produce an electrode. A cyclic voltammetry (CV) test (temperature: room temperature, electrolyte solution: 0.1M $HClO_4$ aqueous solution saturated with $N_2$) was performed on the electrode using an electrochemical measuring device to measure the electrochemical surface area (ECSA) of the catalyst. Subsequently, the electrolyte solution was saturated with $O_2$, and then a voltage cycling test (30,000 cycles) was performed at 0.6 to 1.0V. The electrochemical surface area (ECSA) of the electrode was measured using the method described above before and after the voltage-cycling test.

ECSA loss was calculated based on the measured ECSA values before and after the voltage-cycling test, and the results are shown in Table 1 below.

TABLE 1

| | Example 1 | Example 2 | Example 3 | Example 4 | Comparative Example 1 | Comparative Example 2 |
|---|---|---|---|---|---|---|
| ECSA loss | 35% | 30% | 33% | 31% | 46% | 43% |

As can be seen from Table 1 above, the electrodes produced from electrode slurries of Examples exhibited a notably lower ECSA loss than the electrodes produced from electrode slurries of Comparative Examples.

Figure 4:
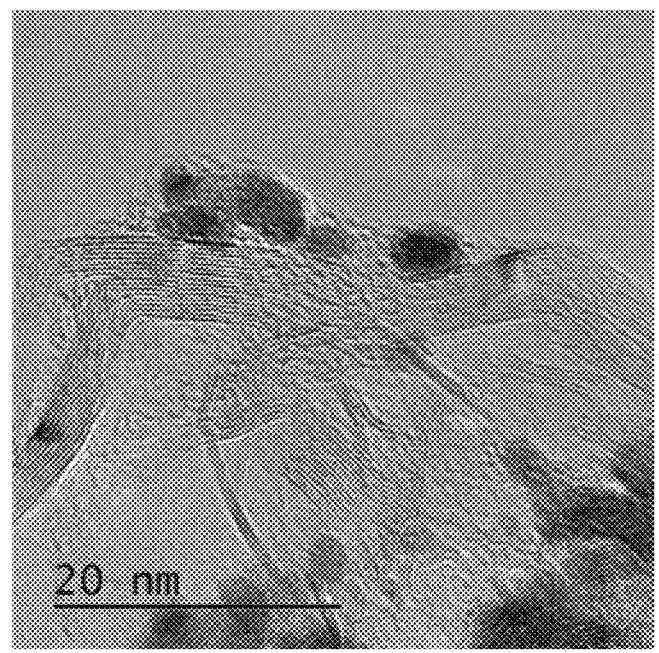
FIG. 4 is a transmission electron microscope (TEM) image showing an electrode produced using the electrode slurry of Example 1.

Meanwhile, FIG. 4 is a transmission electron microscope (TEM) image of an electrode produced using the electrode slurry of Example 1. As can be seen from FIG. 4, the ionomer layer including the chelating agent in the electrode produced from the electrode slurry of Example 1 is well distributed around the catalyst.

(a) and (b) of FIG. 5 are TEM images showing the electrode produce using the electrode slurry of Example 1 before and after the voltage cycling test, and (a) and (b) of FIG. 6 are TEM images showing the electrode produced using the electrode slurry of Comparative Example 1 before and after the voltage cycling test.

When comparing FIG. 5 with FIG. 6, agglomeration of the metal catalyst particles and dissolution of the metal catalyst upon the voltage cycling test were remarkably suppressed in the electrode produced using the electrode slurry of Example 1, compared to the electrode produced using the electrode slurry of Comparative Example 1. In other words, it can be seen that the chelating agent included in the electrode of the present disclosure can prevent deterioration of the catalyst, thereby improving the durability of the electrode.

The invention claimed is:

1. An electrode for a fuel cell comprising:
a catalyst comprising a support and a plurality of metal catalyst particles supported on the support; and
an ionomer layer coated on at least a part of the catalyst and bonded to the catalyst only through a physical bond rather than a chemical bond,
wherein the ionomer layer comprises an ionomer and a chelating agent, and
wherein the chelating agent is dimercaprol, succimer, deferoxamine, Prussian blue, vitamin B-12, α-lipoic acid, desferrioxamine, deferiprone, or a mixture of two or more thereof.

2. The electrode according to claim 1, wherein the ionomer is a fluorine-based ionomer or a hydrocarbon-based ionomer.

3. An electrode for a fuel cell comprising:
a catalyst comprising a support and a plurality of metal catalyst particles supported on the support; and
an ionomer layer coated on at least a part of the catalyst and bonded to the catalyst only through a physical bond rather than a chemical bond,
wherein the ionomer layer comprises an ionomer and a chelating agent, and
wherein the chelating agent is dimercaprol, penicillamine, succimer, α-lipoic acid, triethylamine, deferiprone, or a mixture of two or more thereof.

4. An electrode for a fuel cell comprising:
a catalyst comprising a support and a plurality of metal catalyst particles supported on the support; and
an ionomer layer coated on at least a part of the catalyst and bonded to the catalyst only through a physical bond rather than a chemical bond,
wherein the ionomer layer comprises an ionomer and a chelating agent comprising at least one S atom, and
wherein the chelating agent comprising at least one S atom is dimercaprol, penicillamine, succimer, a-lipoic acid, or a mixture of two or more thereof.

5. An electrode for a fuel cell comprising:
a catalyst comprising a support and a plurality of metal catalyst particles supported on the support; and
an ionomer layer coated on at least a part of the catalyst and bonded to the catalyst only through a physical bond rather than a chemical bond,
wherein the ionomer layer comprises an ionomer and a chelating agent comprising at least two S atoms, and
wherein the chelating agent comprising at least two S atoms is dimercaprol, succimer, α-lipoic acid, or a mixture of two or more thereof.

6. A membrane-electrode assembly comprising:
an anode;
a cathode; and
a polymer electrolyte membrane interposed between the anode and the cathode, wherein at least one of the anode and cathode is the electrode according to claim 1.

* * * * *